(12) United States Patent
Song et al.

(10) Patent No.: US 12,480,948 B2
(45) Date of Patent: Nov. 25, 2025

(54) RATIOMETRIC FLUORESCENT PROBE FOR DETECTING AMINOPEPTIDASE N, AND PREPARATION METHOD AND USE THEREOF

(71) Applicant: Jilin University, Changchun (CN)

(72) Inventors: Daqian Song, Changchun (CN); Pinyi Ma, Changchun (CN); Dejiang Gao, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 773 days.

(21) Appl. No.: 17/856,052

(22) Filed: Jul. 1, 2022

(65) Prior Publication Data

US 2023/0341399 A1  Oct. 26, 2023

(30) Foreign Application Priority Data

Apr. 25, 2022  (CN) .......................... 202210436141.2

(51) Int. Cl.
*G01N 33/573* (2006.01)
*G01N 21/64* (2006.01)
*G01N 33/58* (2006.01)

(52) U.S. Cl.
CPC ........ *G01N 33/573* (2013.01); *G01N 21/6456* (2013.01); *G01N 33/582* (2013.01); *G01N 2333/948* (2013.01)

(58) Field of Classification Search
CPC .............. G01N 33/573; G01N 33/582; G01N 21/6456; G01N 21/6428; G01N 21/6486; G01N 2333/948; C07D 265/34; C09K 11/06; C09K 2211/1033; Y10T 436/141111; Y10T 436/17; Y10T 436/173845

(Continued)

(56) References Cited

FOREIGN PATENT DOCUMENTS

| CN | 106831634 A | * 6/2017 |
| CN | 107602498 A | 1/2018 |

(Continued)

OTHER PUBLICATIONS

Dominguez et al. Chemical Communications, vol. 59, Jan. 31, 2023, pp. 2481-2484.*

(Continued)

*Primary Examiner* — Maureen Wallenhorst
(74) *Attorney, Agent, or Firm* — HOWARD M COHN and Associates, LLC (57) ABSTRACT

Provided is a ratiometric fluorescent probe for detecting aminopeptidase N, and a preparation method and use thereof. In the present disclosure, a Nile blue derivative is adopted as a fluorophore and alanyl is adopted as an identification unit to design and synthesize the ratiometric fluorescent probe NB-APN for detecting APN. After the probe reacts with APN, the NB blocked by alanyl is released, resulting in an increase of a fluorescence peak at 675 nm and a decrease of a fluorescence peak at 610 nm. A ratio signal of the probe exhibits a sensitive response to APN, with a detection limit as low as 15 pg/mL. The probe can be used for quantitative detection of APN in a diluted urine sample, and can also be used for ratiometric fluorescent imaging of APN in a cell model and in vivo fluorescent imaging of APN in a nude mouse tumor model.

5 Claims, 11 Drawing Sheets (58) Field of Classification Search
USPC ..... 436/63, 86, 92, 106, 111, 164, 166, 172; 422/82.08; 435/24
See application file for complete search history.

(56) References Cited

FOREIGN PATENT DOCUMENTS

| | | | |
|---|---|---|---|
| CN | 110330505 A | * | 10/2019 |
| CN | 116462639 A | * | 7/2023 |

OTHER PUBLICATIONS

Ma et al. Sensors and Actuators: B. Chemical, vol. 379, article 133228, Dec. 24, 2022, pp. 1-8.*
Office Action from Chinese Application No. 202210436141.2 dated Sep. 8, 2022 (14 pages).
Zhan et al., "A Fluorescent Probe for Early Detection of Melanoma and Its Metastasis by Specifically Imaging Tyrosinase Activity in a Mouse Model" Analytical Chemistry, 2018, pp. 8807-8815 and S-1-S-21 (30 pages).
Wang Jianguo et al., "Progress in Fluorescent Probes for Aminopeptidase N," Chemi Acadeic Journal Electronic Publishing House, http://www.hxtb.org, 2018, pp. 972-980, English Abstract.

* cited by examiner

FIG. 18 ent probe.
RATIOMETRIC FLUORESCENT PROBE FOR DETECTING AMINOPEPTIDASE N, AND PREPARATION METHOD AND USE THEREOF

CROSS REFERENCE TO RELATED APPLICATION

This patent application claims the benefit and priority of Chinese Patent Application No. 202210436141.2, entitled Ratiometric Fluorescent Probe for Detecting Aminopeptidase N, And Preparation Method and Use Thereof filed on Apr. 25, 2022, the disclosure of which is incorporated by reference herein in its entirety as part of the present application.

TECHNICAL FIELD

The present disclosure belongs to the technical field of biological detection, and in particular relates to a ratiometric fluorescent probe for detecting aminopeptidase N (APN), and a preparation method and use thereof.

BACKGROUND ART

APN, also known as alanine aminopeptidase or CD13, is a zinc ion-dependent exopeptidase that can hydrolyze neutral or basic amino acids from the N-terminus of a protein polypeptide chain to activate a series of important biochemical reactions. APN is widely present in mammals and exists in the form of a homodimer on the cell membrane, and has a variety of important physiological functions in the human body. Urine APN can indicate early kidney damage when a urine protein level is still normal, and thus can be used as an early biomarker of glomerulonephritis. In addition, APN exhibits enhanced enzymatic activity in cancer cells, which makes APN a promising biomarker enzyme for cancer. Therefore, the development of high-sensitivity and high-selectivity real-time detection methods for APN will provide a basis for the diagnosis and pathophysiological research of APN-related diseases.

Fluorescence spectroscopy has attracted much attention due to its unique advantages such as simplicity, convenience, non-invasiveness, real-time detection, high sensitivity, high temporal and spatial resolution, and in vivo imaging. At present, fluorescent probes used for APN detection are mainly divided into two categories: affinity-based fluorescent probes and reaction-based fluorescent probes. The affinity-based fluorescent probes can be used for fluorescent imaging of cancer cells or tumor-transplanted nude mice, but have a large background interference, which heavily affects the imaging quality. For the reaction-based fluorescent probes, the background interference can be effectively reduced through a reaction between a probe and APN that causes a large change in a fluorescence intensity or ratio before and after the reaction. Therefore, in recent years, more and more attention has been paid to the design and development of fluorescent probes for APN.

SUMMARY

In view of this, the present disclosure provides a ratiometric fluorescent probe for detecting APN, and a preparation method and use thereof. A ratio signal of the ratiometric fluorescent probe shows a sensitive response to APN, which has a potential application value for the research and diagnosis of APN-related diseases.

To achieve the above objective of the present disclosure, the present disclosure provides the following technical solutions.

The present disclosure provides a ratiometric fluorescent probe for detecting APN, where a structure of the ratiometric fluorescent probe includes an alanyl group and a Nile blue derivative (NB).

Preferably, in the structure of the ratiometric fluorescent probe, a quantity ratio of the alanyl group to the NB may be 1:1.

The present disclosure also provides a preparation method of the ratiometric fluorescent probe, including the following steps: subjecting boc-L-alanine to a reaction with the NB in a dichloromethane (DCM) solution for 24 h to obtain an intermediate, and subjecting the intermediate to a reaction with $CF_3COOH$ to obtain the ratiometric fluorescent probe.

Preferably, the preparation method of the ratiometric fluorescent probe may include: activating carboxyl of boc-L-alanine, and allowing the activated boc-L-alanine to react with the NB to obtain the intermediate; and subjecting the intermediate to column chromatography, allowing the reaction with the $CF_3COOH$ for 3 h, and subjecting a product to column chromatography to obtain the ratiometric fluorescent probe.

The present disclosure also provides use of the ratiometric fluorescent probe in the preparation of a kit for fluorometric analysis of APN in a body fluid.

Preferably, the body fluid may include urine.

The present disclosure also provides use of the ratiometric fluorescent probe in the preparation of a kit for fluorescent imaging of APN in a cell.

Preferably, the cell may include a human normal cell and a human tumor cell.

The present disclosure also provides use of the ratiometric fluorescent probe in the preparation of a kit for fluorescent imaging of APN in a living organism.

Preferably, the living organism may be a BALB/c nude mouse.

Beneficial effects: The present disclosure provides a ratiometric fluorescent probe for detecting APN. NB is adopted as a fluorophore and alanyl is adopted as an identification unit to design and synthesize the ratiometric fluorescent probe NB-APN for detecting APN. After the probe NB-APN of the present disclosure reacts with APN, the NB blocked by alanyl is released, resulting in an increase of a fluorescence peak at 675 nm and a decrease of a fluorescence peak at 610 nm. A ratio signal of the probe exhibits a sensitive response to APN, with a detection limit as low as 15 pg/mL. The probe can be used for quantitative detection of APN in a diluted urine sample. In addition, due to the prominent biocompatibility and anti-interference ability of NB, the probe can also be used for ratiometric fluorescent imaging of APN in a cell model and in vivo fluorescent imaging of APN in a nude mouse tumor model, which has a potential application value for the research and diagnosis of APN-related diseases.

DETAILED DESCRIPTION OF THE EMBODIMENTS

The present disclosure provides a ratiometric fluorescent probe for detecting APN, where a structure of the ratiometric fluorescent probe includes an alanyl group and a Nile blue (NB) derivative.

In the present disclosure, in the structure of the ratiometric fluorescent probe, a quantity ratio of the alanyl group to the NB derivative may preferably be 1:1. In an embodiment of the present disclosure, it has been verified that a fluorescence emission peak of the probe NB-APN is at 675 nm, which has an obvious red shift relative to a fluorescence peak of NB at 610 nm. The fluorophore NB is released through the identification and hydrolysis of APN to alanyl in the probe, resulting in an obvious change of fluorescence ratio signal; and a working curve of APN detection is established according to a relationship between the fluorescence ratio signal and the APN concentration in this process. The probe NB-APN of the present disclosure shows extremely high sensitivity to APN, with a detection limit as low as 15 pg/mL, and can be used for quantitative detection of APN in urine diluted 500 by folds. In addition, the probe NB-APN of the present disclosure is also successfully used for the imaging of APN in a cell and a nude mouse tumor model, and preliminarily realizes the distinguishing detection of a tumor, which has an important clinical value.

Figure 1:
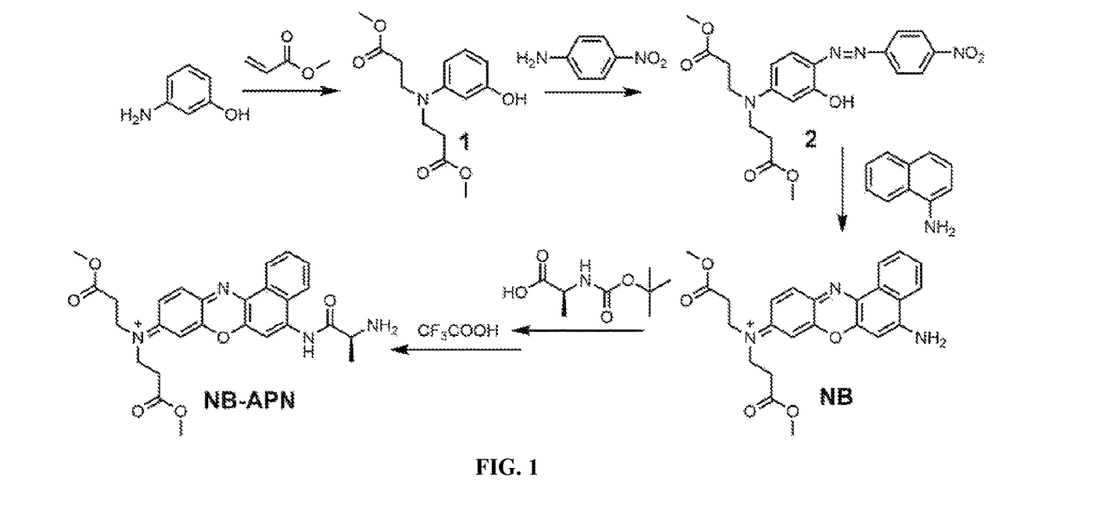
FIG. 1 shows a synthetic route of NB-APN of the present disclosure.

The present disclosure also provides a preparation method of the ratiometric fluorescent probe, and the synthesis flow chart thereof may preferably be shown in FIG. 1, including the following steps: subjecting boc-L-alanine to a reaction with the NB in a DCM solution for 24 h to obtain an intermediate, subjecting the intermediate to a reaction with $CF_3COOH$ for 3 h, and conducting separation and purification to obtain the ratiometric fluorescent probe.

The source of the fluorophore is not particularly limited in the present disclosure, and a conventional commercially available product in the art may preferably be adopted. In the present disclosure, the NB-APN may preferably be synthesized, and a synthesis method may preferably include the step of activating carboxyl of boc-L-alanine by subjecting boc-L-alanine, HATU, and DIPEA to a reaction for 30 min in an ice bath under a DCM atmosphere. In an embodiment, 1 mmol boc-L-alanine and 1 mmol HATU may be preferably dissolved in 40 mL of DCM, then 400 µL of DIPEA may be added, and then a reaction may be conducted in an ice bath for 30 min.

In the present disclosure, after the boc-L-alanine with carboxyl activated is obtained, a solution of 1.2 mmol NB in DCM may preferably be added dropwise to the above reaction solution, and then a reaction may be conducted at room temperature for 24 h. In the present disclosure, after the reaction at room temperature is completed, column chromatography (DCM:methanol: 100:1) may be preferably conducted to obtain an intermediate, then the intermediate may be dissolved in DCM, 1 mL of $CF_3COOH$ may be added under vigorous stirring, and a reaction may be conducted at room temperature for 3 h; and then the solvent may be removed through vacuum distillation, and a resulting solid may be separated by column chromatography (DCM: methanol: 20:1) to obtain the product NB-APN, with a yield of 42%.

After the probe NB-APN of the present disclosure reacts with APN, the absorption and fluorescence spectra both change significantly. For example, a wavelength of a maximum absorption peak is red-shifted from 600 nm to 620 nm, and a wavelength of a fluorescence emission peak is also red-shifted from 610 nm to 675 nm, resulting in a significant change of the fluorescence ratio signal. After the reaction is completed, a ratio of fluorescence signals ($I_{675}/I_{610}$) of the system is increased by 250 times compared with the previous ratio, which is very suitable for the highly sensitive detection of APN.

Figure 9:
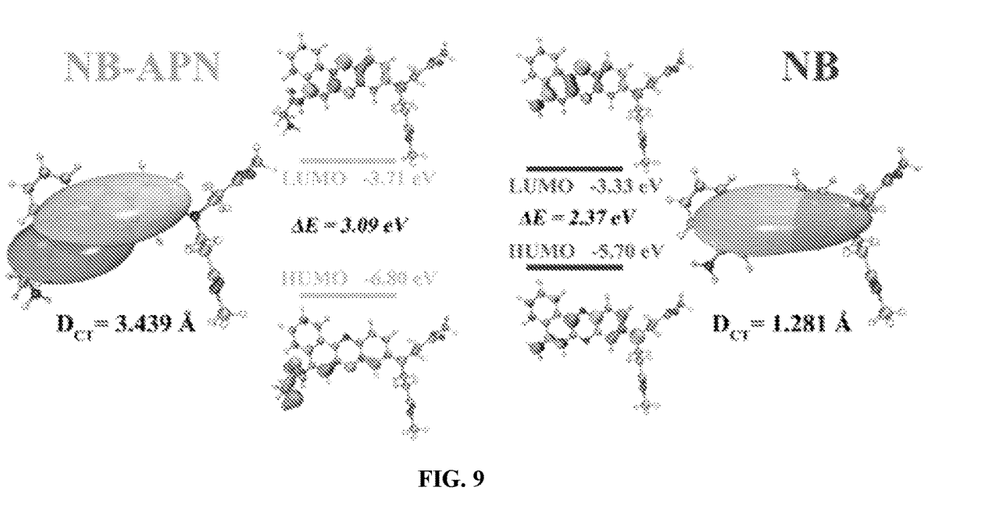
FIG. 9 shows the first vertical excited state frontier molecular orbital and hole-electron distribution of NB-APN and NB.

In the present disclosure, the luminescence mechanism of the probe NB-APN before and after the reaction with APN may be subjected to a theoretical calculation, which may preferably include: the Gaussian 16 software is used to calculate optimal geometric and electronic structures of NB-APN with a time-dependent density functional theory (TDDFT) at a B3LYP (GD3BJ)/def2-SVP level, and resulting data are further analyzed with the Multiwfn 3.8 software. In the present disclosure, the luminescence mechanism of the NB-APN in the presence of APN may be subjected to a theoretical calculation, which may preferably include: the TDDFT is used to calculate and analyze optical properties based on the optimal excited-state geometric structure (FIG. 9). The calculated first vertical excited state HOMO-LUMO energy gaps of NB-APN and NB are 3.09 eV and 2.37 eV, respectively. A maximum theoretical emission peak of NB-APN is at 630.10 nm (f=1.2587), and a maximum theoretical emission peak of NB is at 676.54 nm (f=1.1918), which is consistent with the red shifts of the fluorescence peaks determined by experiments. In addition, a charge transfer distance is determined according to the electron density change and hole-electron theory. Double charge transfer (DCT) values of NB-APN and NB are 3.439 Å and 1.281 Å, respectively. These results suggest that the fluorescence change is mainly caused by intramolecular charge transfer (ICT).

Figure 10:
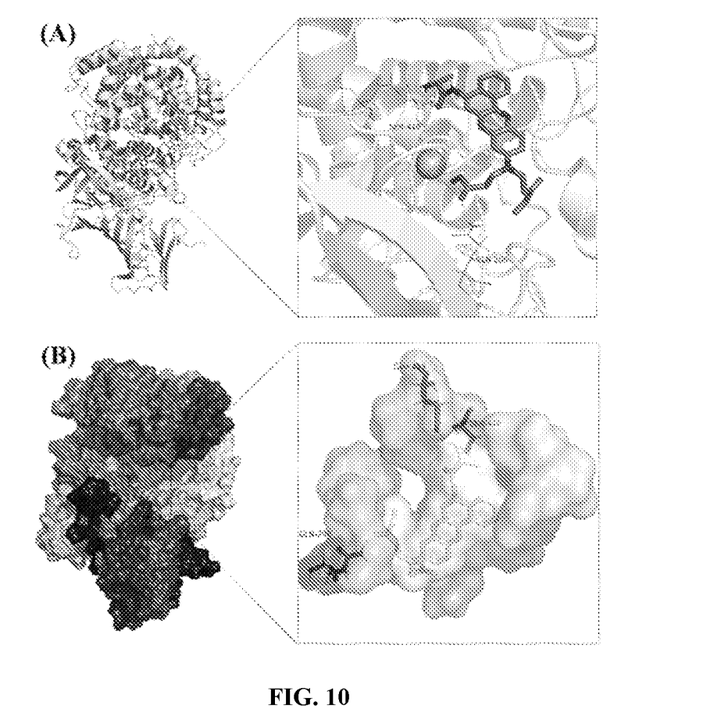
FIG. 10 shows the simulation results of molecular docking of an interaction between NB-APN and APN, where in panel A, the white ribbon represents a crystal structure of APN and the yellow-green sphere represents a zinc ion; and panel B is the prospective view of A.

In addition, the present disclosure also uses a crystal structure of APN (PDB ID: 4FKK) to conduct molecular docking on the AutoDock 4.0 software. Charges are calculated using Gasteiger. All atoms are set to the AD4 atomic mode and all rotatable bonds are set to "rotatable". Docking period and parameters between the ligand and the protein are set to default values. A docking model adopts the PyMOL software for display. Molecular docking results show that NB-APN can form three hydrogen bonds with the three amino acids (GLN206, SER410, and GLU413) in APN. The binding energy of NB-APN to APN is −8.88 kcal/mol, indicating that NB-APN has a strong affinity to APN (FIG. 10).

Figure 11:
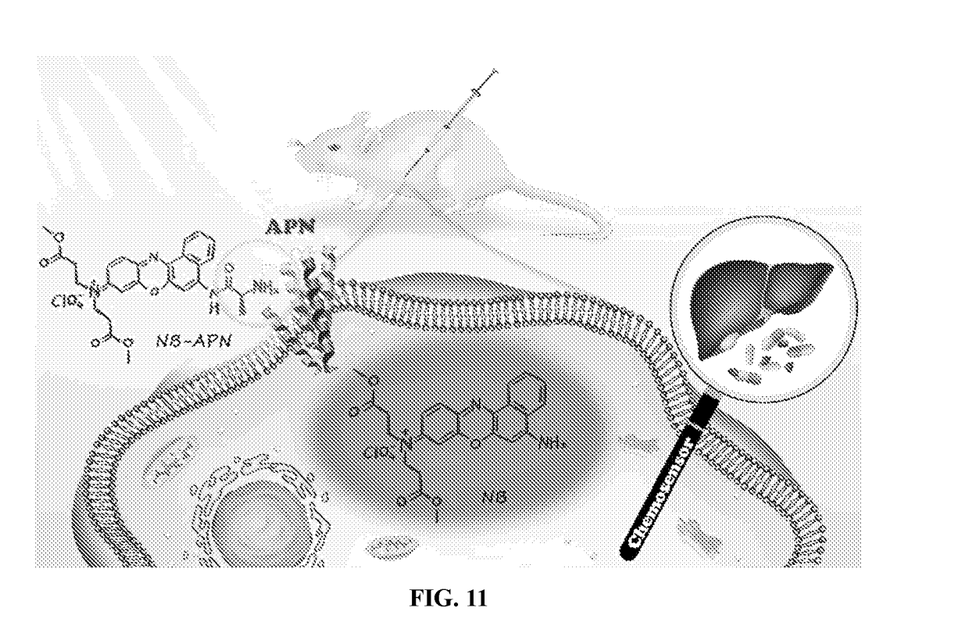
FIG. 11 shows an identification mechanism of NB-APN for APN and a biological application of NB-APN.

It can be seen from the above that a recognition mechanism between NB-APN and APN is shown in FIG. 11, APN specifically recognizes the acryloyl of NB-APN, which leads to the release of NB and the red shift of fluorescence.

The present disclosure also provides use of the ratiometric fluorescent probe in the preparation of a kit for fluorometric analysis of APN in a body fluid.

The body fluid of the present disclosure may preferably include urine. In an embodiment, the probe is successfully used in the detection of APN in diluted urine, with a detection limit as low as 15 pg/mL.

The present disclosure also provides use of the ratiometric fluorescent probe in the preparation of a kit for fluorescent imaging of APN in a cell.

The cell of the present disclosure may preferably include a human normal cell and a human tumor cell, where the human normal cell may include a normal human hepatocyte, and the human tumor cell may preferably include a human liver cancer cell, a human lung cancer cell, a human cervical cancer cell, a human osteosarcoma cell, and a mouse cutaneous melanoma cell. In an embodiment of the present disclosure, HepG2 cells and LO2 cells pre-stained with Hoechst-33342 are co-cultivated, then incubated with the probe NB-APN, and then imaged; and HepG2 cells can be clearly distinguished from LO2 cells through a fluorescence intensity ratio R, and this result is consistent with the result of Hoechst-33342 staining, indicating that the ratiometric probe of the present disclosure can be effectively used in the distinguishing detection of normal cells and liver cancer cells and has a promising application prospect. In an embodiment of the present disclosure, the NB-APN can also be used for imaging the activity of APN in different cell lines (A549, B16F10, HeLa, MG63, and HepG2). It is confirmed by a western blot test that the obtained results are reliable. Therefore, the NB-APN is also a promising tool in various other cell line applications.

The present disclosure also provides use of the ratiometric fluorescent probe for monitoring an APN concentration after a drug-induced liver injury (DILI) caused by excessive use of an antipyretic analgesic APAP and for monitoring an APN concentration after an anti-DILI hepatoprotective effect.

In an embodiment of the present disclosure, the production of APN in APAP-stimulated cells is assessed with the NB-APN. The effectiveness of NB-APN in monitoring APN changes during an APAP-induced hepatotoxic process is confirmed. Furthermore, the NB-APN is used to study a relationship between a hepatotoxicity therapy and an APN level in living cells. Four drugs (NAC, GSH, TIO, and Glu) are investigated as anti-DILI hepatoprotective agents. It is confirmed by a western blot test that the obtained results are reliable. The above results indicate that the NB-APN can effectively monitor the fluctuation of intracellular APN after APAP stimulation, and can be used to evaluate a protective effect of a drug for DILI.

The present disclosure also provides use of the ratiometric fluorescent probe in the preparation of a kit for fluorescent imaging of APN in a living organism.

In an embodiment of the present disclosure, the probe NB-APN is intratumorally injected into nude mice, an obvious fluorescence signal appears at the tumor site, and the fluorescence signal lasts for a long time. Therefore, the probe NB-APN can detect APN at a living organism level, and can also be used for APN biopsy of a tumor tissue.

The ratiometric fluorescent probe for detecting APN and the preparation method and use thereof provided in the present disclosure will be described in detail below with reference to examples, but these examples cannot be understood as limiting the claimed scope of the present disclosure.

EXAMPLE 1

NB-APN was synthesized according to the flow chart shown in FIG. 1. 1 mmol of boc-L-alanine and 1 mmol of HATU were dissolved in 40 mL of DCM, 400 μL of DIPEA was added, and a resulting mixture was subjected to a reaction in an ice bath for 30 min; a solution of 1.2 mmol of NB in DCM was added dropwise to the reaction solution obtained above, a reaction was conducted at room temperature for 24 h, and then column chromatography (DCM: methanol: 100:1) was conducted to obtain an intermediate; then the intermediate was dissolved in DCM, 1 mL of $CF_3COOH$ was added under vigorous stirring, and a reaction was conducted at room temperature for 3 h; and then the solvent was removed through vacuum distillation, and a resulting solid was separated by column chromatography (DCM:methanol=20:1) to obtain the product NB-APN, with a yield of 42%. HR-MS (m/z) for $C_{27}H_{29}N_4O_6^+$ [NB-APN—$ClO_4$]$^+$: calculated, 505.2082; found: 505.2085. $^1$H-NMR (300 MHz, Methanol-$d_4$) δ9.08 (d, 1H), 8.62(s, 1H), 8.46 (d, J=8.3 Hz, 1H), 8.08 (d, J=9.9 Hz, 1H), 8.03-7.82 (m, 3H), 7.33 (d, J=2.5 Hz, 1H), 4.52 (t, J=7.0 Hz, 1H), 3.99 (t, 4H), 3.78 (s, 6H), 2.60 (t, J=7.1 Hz, 4H), 1.77 (d, J=7.1 Hz, 3H). $^{13}$C-NMR (75 MHz, Methanol-$d_4$) δ172.44, 171.58, 160.28, 151.83, 147.33, 144.64, 143.37, 136.76, 132.22, 132.06, 131.72, 130.03, 126.01, 124.84, 124.79, 123.94, 108.70, 98.38, 51.53, 51.48, 45.48, 29.98, 17.95.

EXAMPLE 2

The NB-APN obtained in Example 1 was tested.

1. The probe NB-APN was dissolved in DMSO to prepare a 1 mM stock solution, and then 4 mL of PBS (pH 7.4) and 25 μL of the probe stock solution were added to a 5 mL centrifuge tube and thoroughly mixed; an APN solution was added, and a reaction system was diluted to 5 mL with PBS; and the reaction system was incubated in a shaker at 37° C. for 20 min, and then the fluorescence spectrum ($\lambda_{ex}$=560 nm) and absorption spectrum were determined. A sample prepared under the same conditions without adding the APN solution was adopted as a control group and subjected to spectroscopic analysis.

Figure 2:
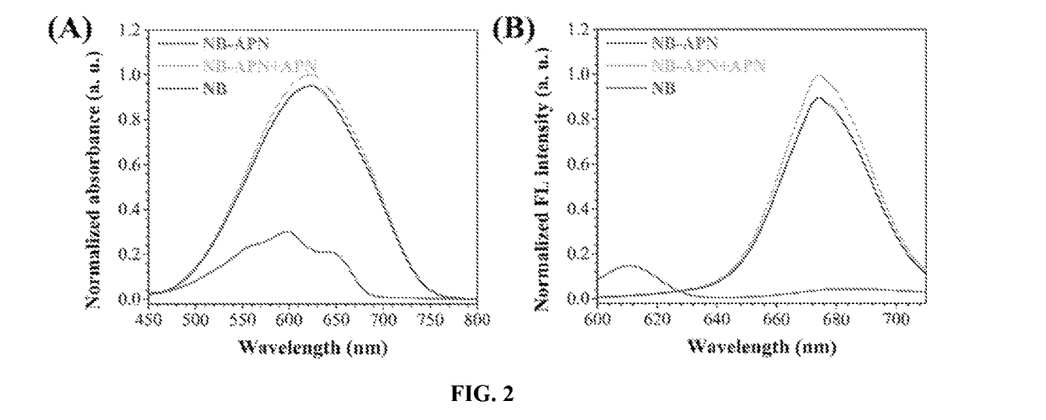
FIG. 2 shows absorption spectra (A) and fluorescence spectra (B) of NB, NB-APN, and NB-APN in phosphate-buffered saline (PBS) with APN (50 ng/mL)

Results are shown in FIG. 2, and it can be seen that, after the probe NB-APN reacted with APN, the absorption and fluorescence spectra both changed significantly. A wavelength of a maximum absorption peak was red-shifted from 600 nm to 620 nm, and a wavelength of a fluorescence emission peak was also red-shifted from 610 nm to 675 nm, resulting in a significant change of the fluorescence ratio signal. After the reaction was completed, a ratio of fluorescence signals ($I_{675}/I_{610}$) of the system was increased by 250 times compared with the previous one, which is very suitable for highly sensitive detection of APN. In addition, the absorption and fluorescence spectra of the solution obtained after the reaction were highly-consistent with that of NB, indicating that the fluorophore NB was produced in the reaction solution.

To further confirm the mechanism of the reaction, the reaction solution was characterized by mass spectrometry (MS). After the reaction, a characteristic MS peak of NB was detected, indicating that the reaction involved the specific recognition and hydrolysis of the alanyl in the probe NB-APN by APN to release the fluorophore NB.

Figure 3:
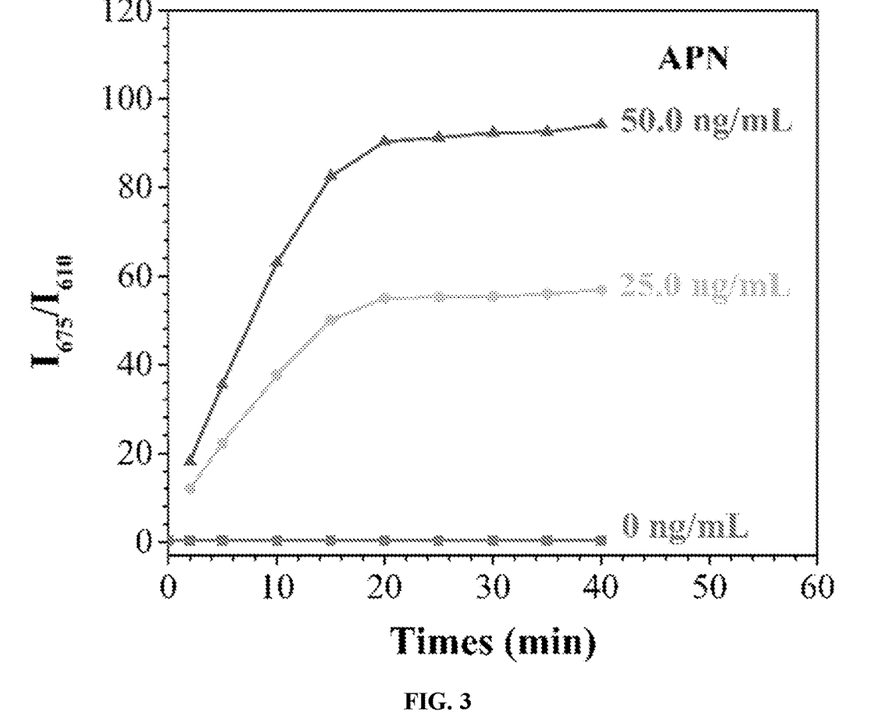
FIG. 3 shows a relationship between a fluorescence ratio $I_{675}/I_{610}$ of NB-APN (10 μM) and a reaction time in the presence of APN at different concentrations, with $\lambda_{ex}$=560 nm, 37° C., and pH 7.4.
Figure 4:
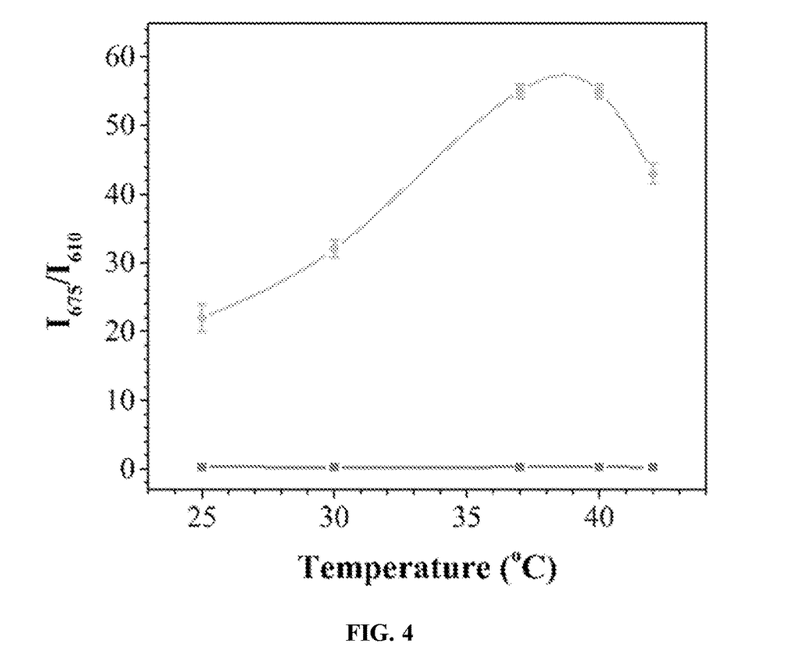
FIG. 4 shows the influence of temperature on a fluorescence ratio $I_{675}/I_{610}$ of NB-APN (10 μM) in the presence (green) and absence (red) of APN (25 ng/mL), with $\lambda_{ex}$=560 nm, pH 7.4, and 20 min.
Figure 5:
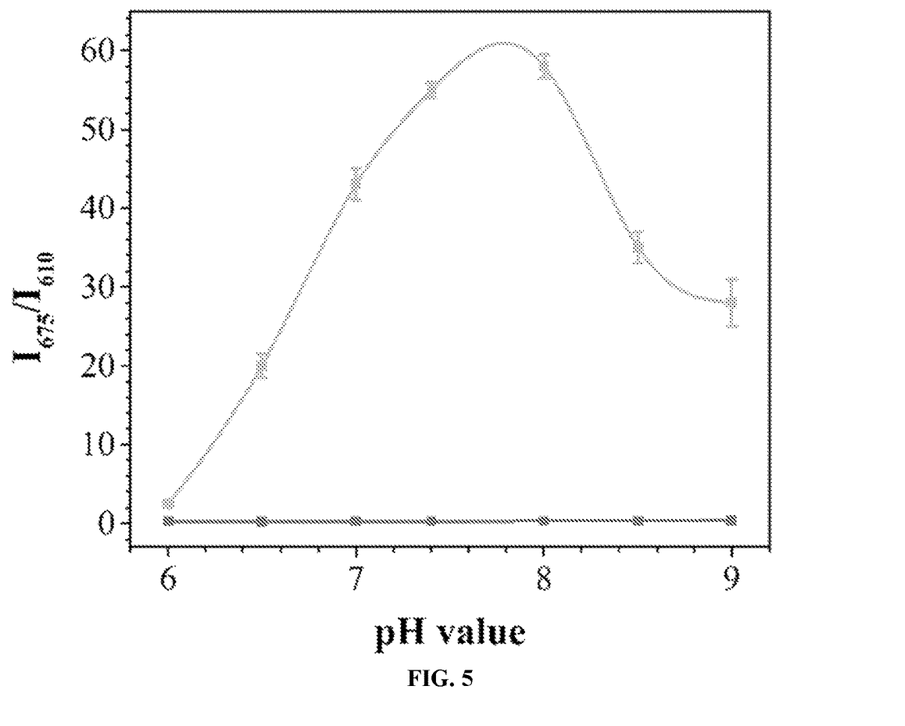
FIG. 5 shows the influence of pH on a fluorescence ratio $I_{675}/I_{610}$ of NB-APN (10 μM) in the presence (green) and absence (red) of APN (25 ng/mL), with $\lambda_{ex}$=560 nm, 37° C., and 20 min.

2. The influence of temperature, pH, and reaction time on the change of a fluorescence intensity ratio of a reaction system was investigated. As shown in FIG. 3, after the probe NB-APN reacted with APN, a fluorescence ratio of a resulting reaction system increased rapidly and reached a plateau at 20 min; and during the whole process, the fluorescence of the probe NB-APN was hardly affected, indicating that the probe NB-APN has high stability. In addition, the fluorescence ratio of the reaction system under physiological conditions (37° C., pH 7.4) almost reached the maximum value (FIG. 4 and FIG. 5). Therefore, in view of the requirements of the subsequent cell imaging experiment, the reaction conditions were set as physiological conditions (37° C., pH 7.4) and the reaction time was set as 20 min.

3. Linear Range and Detection Limit

Figure 6:
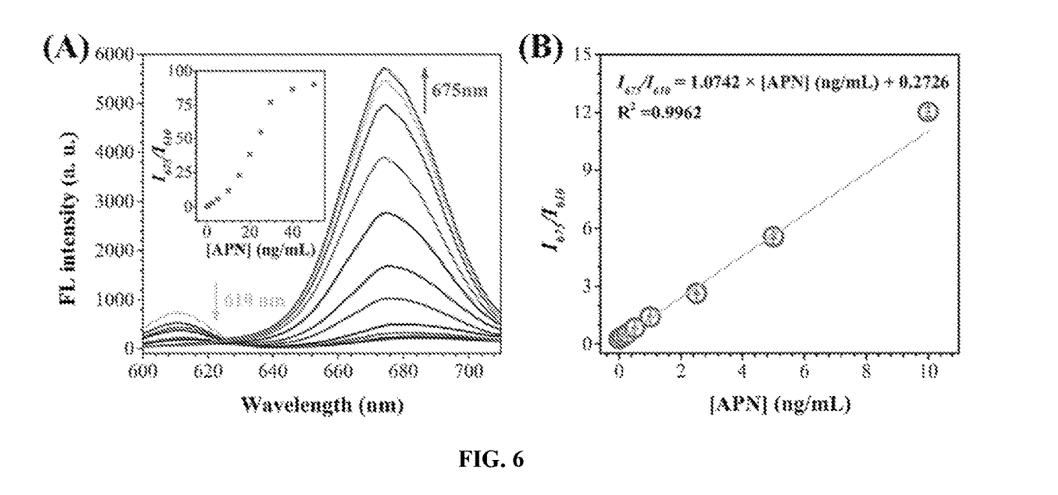
FIG. 6 shows a detection range and a detection limit of NB-APN for APN, where panel A shows fluorescence spectra of NB-APN (10 μM) in the presence of APN at different concentrations (0 ng/mL to 50 ng/mL), and panel B shows a relationship between $I_{675}/I_{610}$ and an APN concentration, with $\lambda_{ex}$=560 nm.

Under optimized experimental conditions, as an APN concentration increased from 0 ng/mL to 50 ng/mL, a fluorescence ratio $I_{675}/I_{610}$ of NB-APN gradually increased (panel A of FIG. 6). When the APN concentration was in a range of 0 ng/mL to 10 ng/mL, there was a prominent linear relationship between the fluorescence ratio of the system and the APN concentration, with a linear equation of $I_{675}/I_{610}$=1.0742×[APN/(ng/mL)]+0.2726, $R^2$=0.9962. As calculated, a detection limit of the system was 15 pg/mL, which is suitable for the detection of trace APN in an organism (panel B of FIG. 6).

4. Inhibitor Experiments

Inhibitor experiments: a: NB-APN (10 μM); b: system (a)+APN (25 ng/mL); c: system (b)+bestatin (1 μM); and d: system (b)+bestatin (10 μM).

Figure 7:
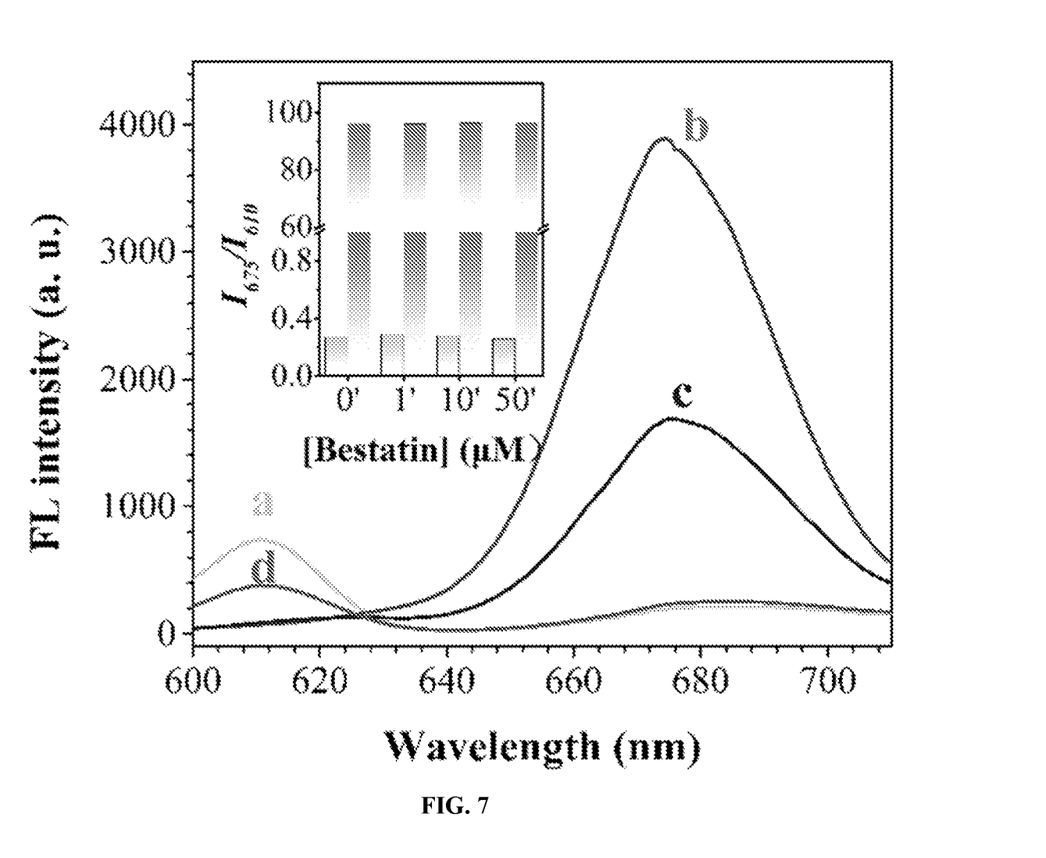
FIG. 7 shows fluorescence spectra of different reaction systems, where a is for NB-APN (10 μM); b is for the system (a)+APN (25 ng/mL); c is for the system (b)+bestatin (1 μM); d is for the system (b)+bestatin (10 μM); and the insert graph shows the influence of different concentrations of bestatin on a fluorescence ratio $I_{675}/I_{610}$ of 10 μM NB-APN (green) or 10 μM NB (red), with $\lambda_{ex}$=560 nm, 37° C., pH 7.4, and 20 min.

The influence of different concentrations of bestatin on the fluorescence ratio $I_{675}/I_{610}$ of 10 μM NB-APN (green) or 10 μM NB (red) was investigated, with $\lambda_{ex}$=560 nm, 37° C., pH 7.4, 20 min. Results are shown in FIG. 7. It was observed that the inhibitor bestatin for APN exhibited a significant inhibitory effect on the fluorescence ratio signal of the system, but the fluorescence signals of the probe NB-APN and fluorophore NB were hardly affected, proving that the change of the fluorescence signal in the system was indeed caused by the enzymatic activity of APN.

5. Selectivity Research

The reactivity of the probe NB-APN with some common substances including inorganic salts, bioactive molecules, reactive oxygen species (ROS), and aminopeptidase was investigated.

Figure 8:
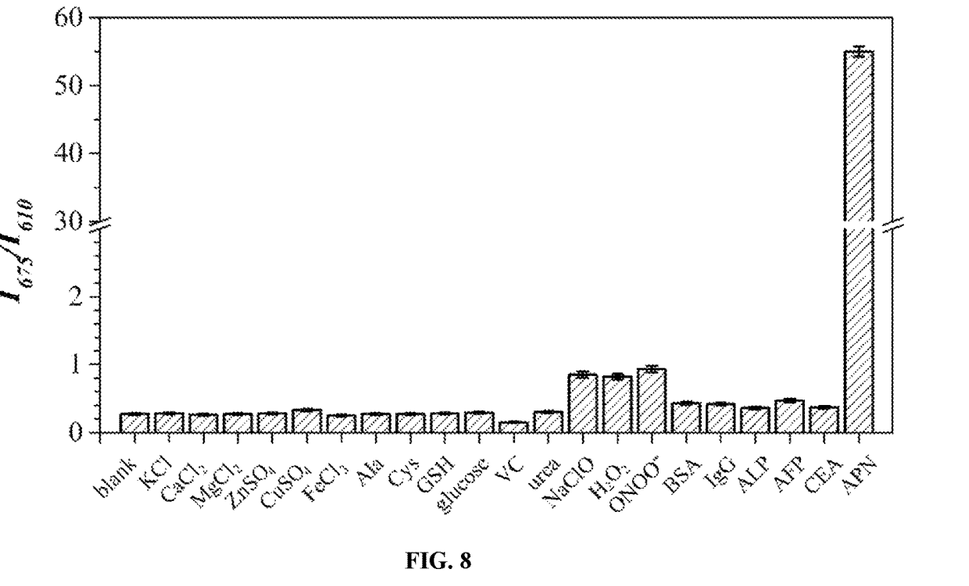
FIG. 8 shows the fluorescence ratio $I_{675}/I_{610}$ response of NB-APN (10 μM) to various potential interfering substances, including KCl 150 mM, $CaCl_2$ 10 mM, $MgCl_2$ 10 mM, $ZnSO_4$ 1 mM, $CuSO_4$ 1 mM, $FeCl_3$ 100 μM, Ala (alanine) 1 mM, Cys (cysteine) 1 mM, GSH (glutathione) 1 mM, glucose 10 mM, VC (vitamin C) 10 mM, urea 10 mM, NaClO 100 μM, $H_2O_2$ 100 μM, $ONOO^-$ 100 μM, BSA 1 mg/mL, IgG 1 mg/mL, alkaline phosphatase (ALP) 50 U/L, alpha fetoprotein (AFP) 50 pmol/L, carcinoembryonic antigen (CEA) 50 pmol/L, APN 25 ng/mL, and $\lambda_{ex}$=560 nm.

Results are shown in FIG. 8. The fluorescence intensity ratio of the system increased significantly only in the presence of APN, and the addition of other substances hardly caused a significant change. It indicated that the probe NB-APN had prominent selectivity for APN, which was mainly attributed to the specific recognition and hydrolysis of alanyl by APN. Therefore, the probe NB-APN can be used in the detection of APN in a complex environment such as a biological system.

EXAMPLE 3

Detection of APN in Urine

Glomerulonephritis is a major cause of end-stage renal diseases (EARDs), and APN content in urine is one of the important detection indexes for glomerulonephritis. Therefore, the rapid and sensitive detection of APN in urine is of great significance to medical diagnosis of such diseases.

A urine sample from a healthy human was diluted 500 times with PBS, then the NB-APN probe was added, and the detection was conducted according to the parameters in Example 2. As calculated, APN content in the healthy human urine was 580 ng/mL, which was consistent with the test result obtained using a commercial ELISA kit.

APN was added to a urine sample at different concentrations to simulate urine samples of patients with renal diseases, and then the urine samples were tested with each of the probe and the ELISA kit. It could also be found that there was no significant difference between the two results (Table 1).

TABLE 1

Determination of APN in urine samples (n = 3)

| Added amount (ng/mL) | Detected amount (ng/mL) | Recovery rate (%) | RSD (%) | ELISA (ng/mL) |
|---|---|---|---|---|
| 0 | 580 | — | 3.5 | 602 |
| 500 | 996 | 92.2 | 3.8 | 1035 |
| 750 | 1275 | 95.9 | 2.9 | 1306 |
| 1000 | 1546 | 97.8 | 5.3 | 1522 |

EXAMPLE 4

Cytotoxicity Research

The cytotoxicity of NB-APN on HepG2 cells was investigated by the MTT standard method, and results are shown in FIG. 9. When a probe concentration reached 50 μM, the survival rate of the cells was not significantly affected, indicating that the probe has prominent biocompatibility and can be used for the detection of APN in an organism.

EXAMPLE 5

Cell Imaging Analysis

The probe NB-APN was used for the imaging analysis of APN in liver cancer cells HepG2 and normal hepatocytes LO2. A confocal fluorescence microscope was adopted, and an excitation light source with a wavelength of 559 nm was adopted. The light emitted from a yellow channel (580 nm to 620 nm) and a red channel (660 nm to 700 nm) was collected. The HepG2 cells and LO2 cells were each pre-treated with bestatin (100 μM) for 1 h and then incubated with NB-APN (5 μM) for 30 min.

Results are shown in FIG. 10. After the HepG2 cells and LO2 cells were incubated with the probe, the fluorescence intensity of the yellow channel in the cells was gradually weakened, and the ratio R of the red channel to the yellow channel gradually increased and reached a plateau at 30 min.

In addition, under the same conditions, the R value for HepG2 cells was significantly higher than the R value for LO2 cells, and both of the R values were significantly reduced under the treatment of the inhibitor bestatin, indicating that the change in the intracellular fluorescence ratio R was indeed caused by the enzymatic activity of APN and the enzymatic activity of APN in HepG2 cells was significantly higher than the enzymatic activity of APN in LO2 cells. Therefore, it can be considered that the probe NB-APN can be used for the detection of intracellular APN, and can also be used for the distinguishing detection of liver cancer cells due to the high enzymatic activity of APN in liver cancer cells, which has a promising biological application prospect.

HepG2 and LO2 cells pre-stained with Hoechst-33342 were co-cultivated, incubated with the probe, and then imaged. As shown in FIG. 11, HepG2 cells could be clearly distinguished from LO2 cells through the fluorescence intensity ratio R, and this result was consistent with the result of Hoechst-33342 staining, indicating that the ratiometric probe can be effectively used in the distinguishing detection of normal hepatocytes and liver cancer cells and has a promising application prospect.

The NB-APN was used for imaging the activity of APN in different cell lines (A549, B16F10, HeLa, MG63, and HepG2), and a specific method was the same as above.

Figure 17:
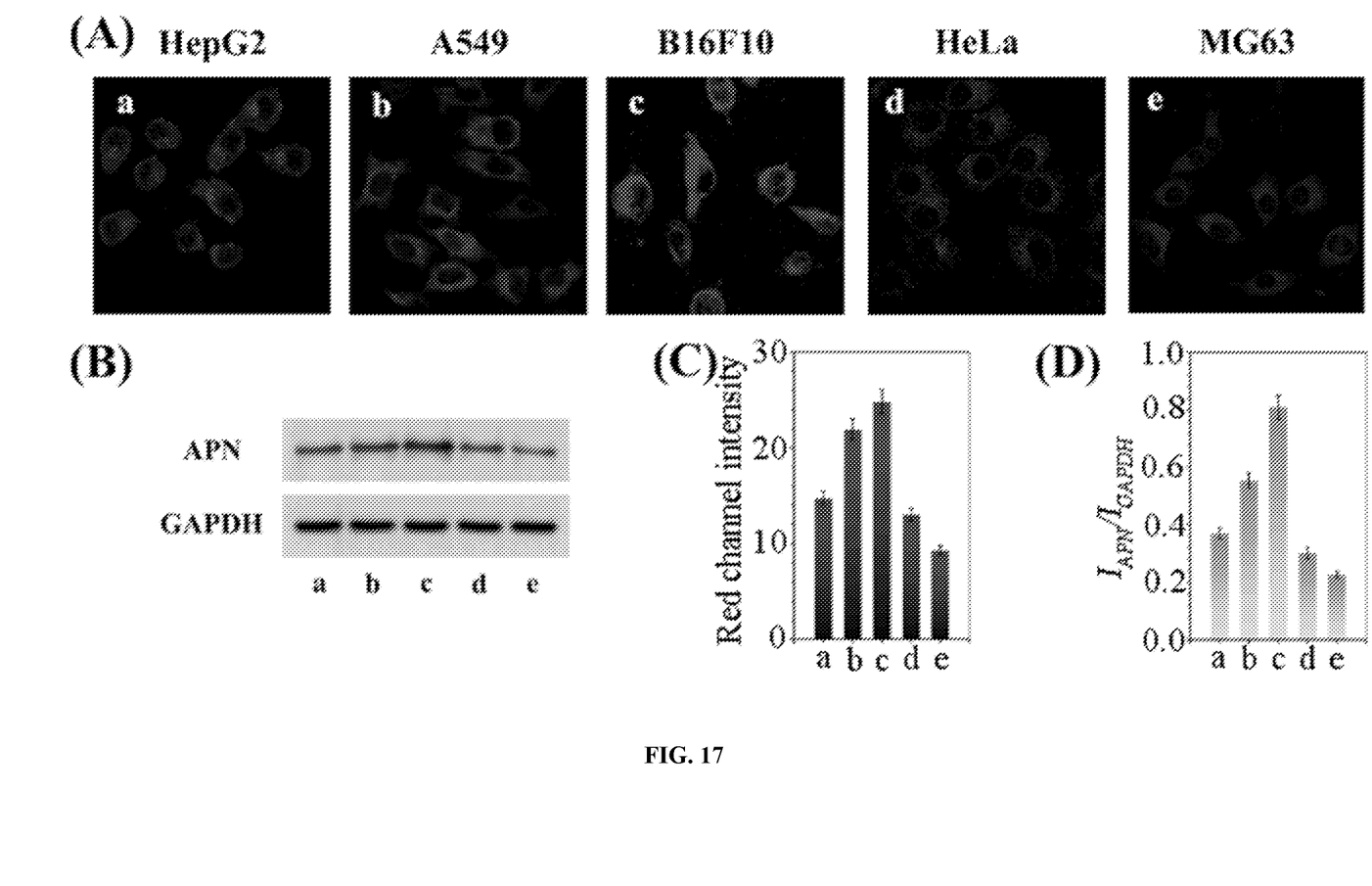
FIG. 17 shows the fluorescence images (panel A) and western blot analysis results (panel B) of different cell lines incubated with APN, where a is for HepG2 cells+NB-APN (5 μM); b is for A549 cells+NB-APN (5 μM); c is for B16F10 cells+NB-APN (5 μM); d is for HeLa cells+NB-APN (5 μM); e is for MG3 cells+NB-APN (5 μM); (panel C) shows red fluorescence intensities corresponding to (A); (panel D) shows mean intensity ratios ($I_{APN}/I_{GAPDH}$) corresponding to (B); and GAPDH is adopted as a protein standard.

Results are shown in FIG. 17. A fluorescence signal of the red channel of each of A549 and B16F10 cells was stronger than that of HepG2 cells. In contrast, the red fluorescence signal of each of HeLa and MG63 cells was weaker than that of HepG2 cells. It was shown that APN levels in different cell lines were different, and a result of western blot confirmed this discovery. Therefore, the NB-APN can be used as a tool to detect intracellular APN, and can also be used for the distinguishing detection of liver cancer cells due to the high enzymatic activity of APN in liver cancer cells. NB-APN is also a promising tool in various biological applications.

Figure 18:
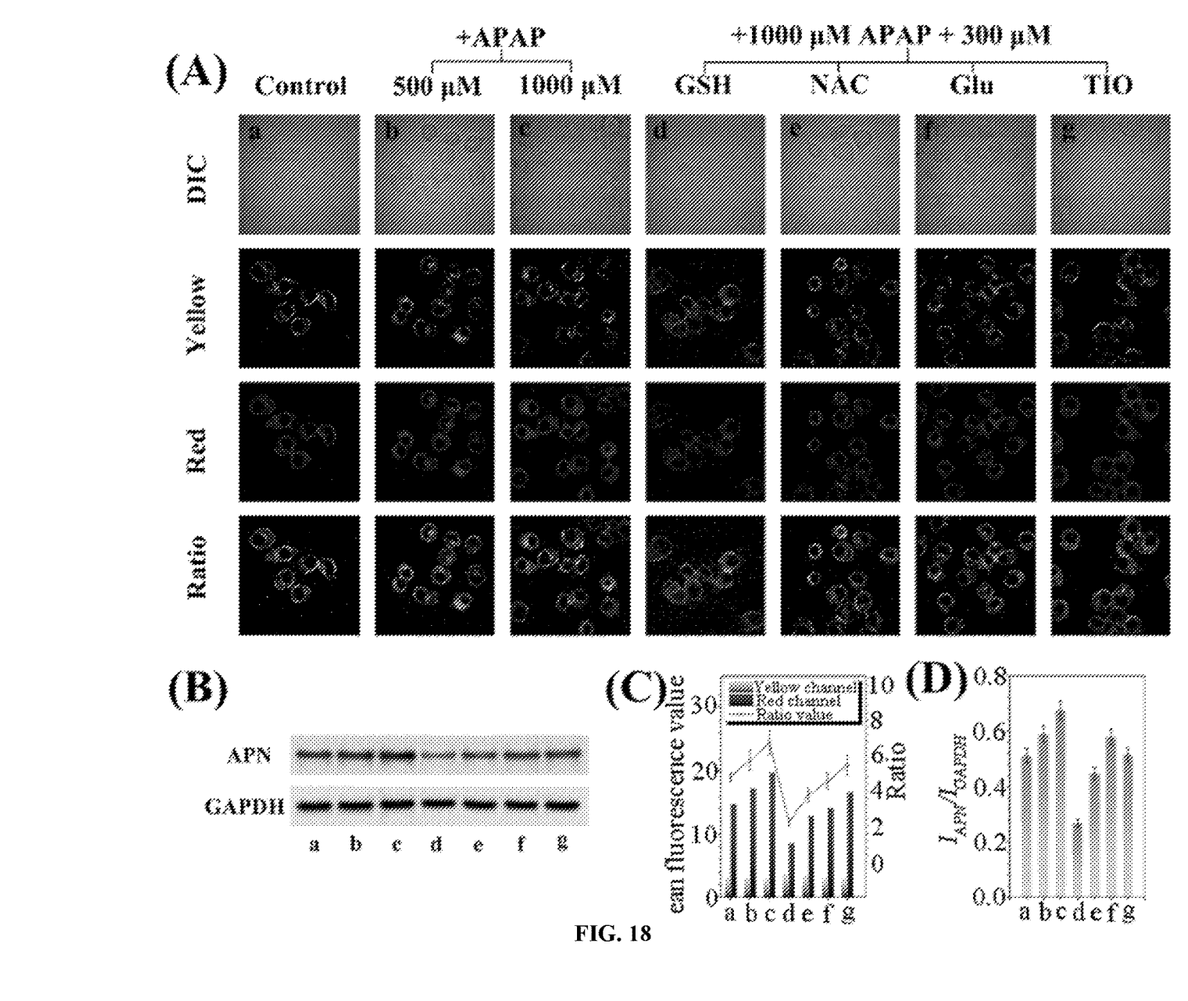
FIG. 18 shows the fluorescence images (panel A) and western blot analysis results (panel B) of HepG2 cells incubated with APN in presence of different compounds, where a is for HepG2+NB-APN (5 μM); b and c are for HepG2+APAP (500 μM, b) or APAP (1,000 μM, c)+NB-APN (5 μM); d to g are for HepG2+NAC (d), GSH (e), Glu (f), or TIO (g) (300 μM)+APAP (1,000 μM))+NB-APN (5 μM); (panel C) shows fluorescence ratios ($I_{red}/I_{yellow}$) corresponding to (panel A); (panel D) shows corresponding mean intensity ratios ($I_{APN}/I_{GAPDH}$); and GAPDH is adopted as a protein standard.

It has been reported that the excessive use of antipyretic analgesic acetaminophen (APAP) can cause drug-induced liver injury, during which process an APN concentration increases. The present disclosure also evaluates the performance of NB-APN in monitoring APN changes during APAP-induced acute hepatotoxicity and a drug treatment thereof. The NB-APN was used to evaluate the production of APN in APAP-stimulated cells. The NB-APN showed obvious red fluorescence (the R value was greater than 4) after acting on HepG2 cells, indicating the existence of intrinsic APN. The gradual increase in the R value with the increase in the APAP concentration confirmed the effectiveness of NB-APN in monitoring APN changes during an APAP-induced hepatotoxic process. Furthermore, the NB-APN was used to study a relationship between the hepatotoxicity therapy and the APN level in living cells. Four drugs (NAC, GSH, TIO, and Glu) were investigated as anti-DILI hepatoprotective agents. The four drugs exhibited an obvious inhibitory effect on the red fluorescence of HepG2 cells. The results showed that when APN was used as a hepatotoxicity index, an anti-hepatotoxic effect of GSH was better than that of NAC and Glu, but worse than that of TIO. This may be because the intake of GSH helps to improve the detoxification ability of the liver and reduce the damage of APAP to the liver. In addition, the western blot result was also consistent with the result of fluorescent imaging. The above results indicate that the NB-APN can effectively monitor the fluctuation of intracellular APN after APAP stimulation, and can be used to evaluate a protective effect of a drug for DILI (FIG. 18).

EXAMPLE 6

In vivo Imaging Analysis

Transplanted tumors from two nude mice were respectively pre-injected with 50 μL of PBS (control) and bestatin (100 μM), and 1 h later, 50 μL of NB-APN (50 μM) was intratumorally injected. Imaging was conducted at different time points (0 h, 0.25 h, 0.5 h, 1.0 h, 2.0 h, and 4.0 h) after the NB-APN injection.

Figure 12:
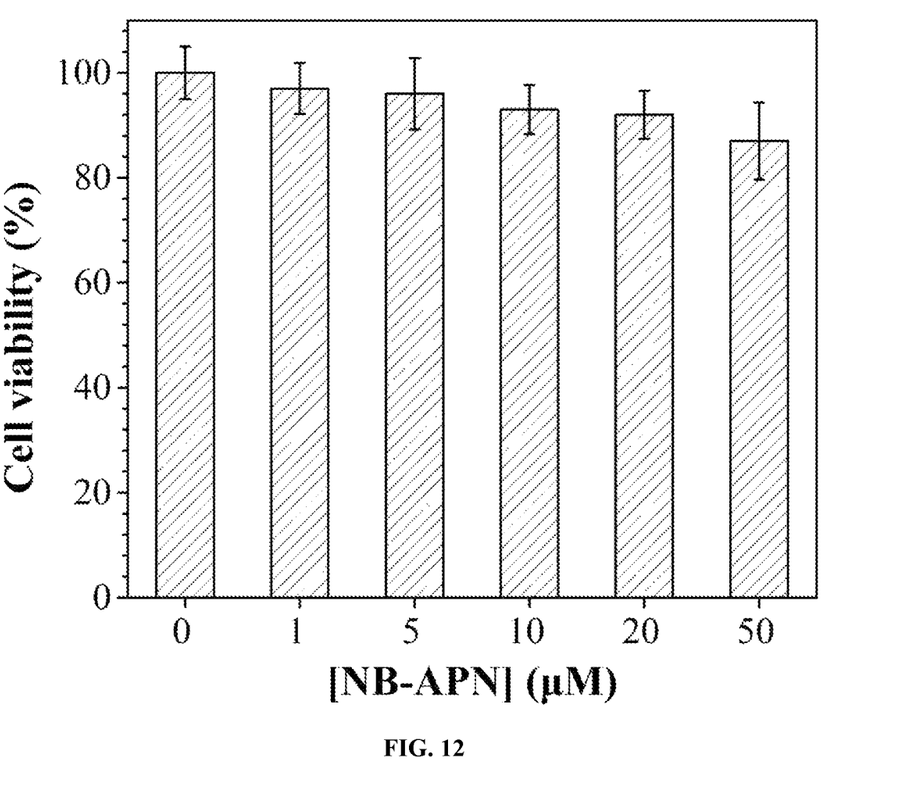
FIG. 12 shows the cell viability of HepG2 cells in the presence of NB-APN at different concentrations.

The intratumoral injection was adopted to study tumor imaging in a nude mouse liver cancer model under the red luminescence channel, and results are shown in FIG. 12. The fluorescence background of the nude mouse before the probe injection was very low. After the nude mouse in the experimental group was injected with the probe NB-APN solution, an obvious fluorescence signal appeared at the tumor site, and this fluorescence signal could still be clearly observed after lasting for 4 h. In contrast, as the nude mouse in the control group was injected with the APN inhibitor bestatin, a fluorescence signal at the tumor site was significantly weaker than that of the experimental group. It can be considered accordingly that the fluorescence signal in a tumor is caused by the enzymatic activity of APN and thus the probe NB-APN can detect APN at a living organism level.

Figure 13:
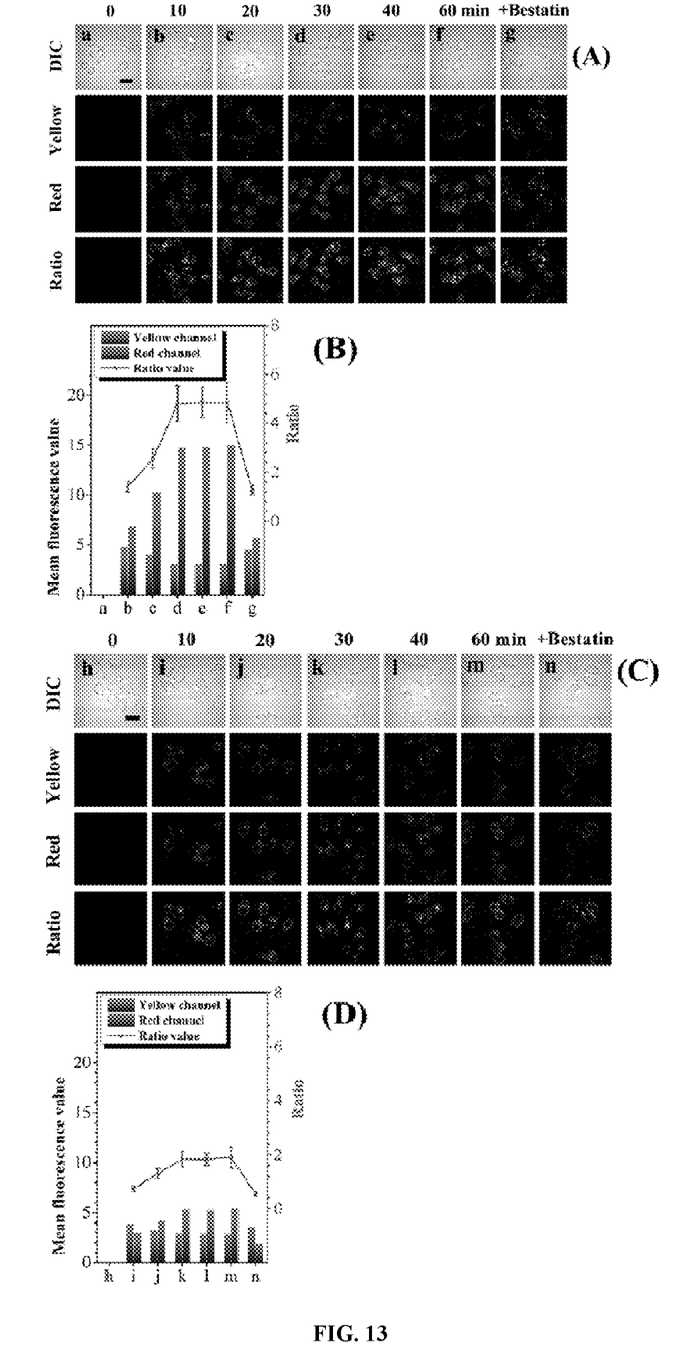
FIG. 13 shows the results of cell imaging analysis of NB-APN, where (A) and (C) respectively show fluorescence images of HepG2 cells and LO2 cells incubated with NB-APN (10 μM) for different times (0 min, 10 min, 20 min, 30 min, 40 min, and 60 min) at a scale bar of 20 μm; mean fluorescence intensities of the yellow channel (580 nm to 620 nm) and the red channel (660 nm to 700 nm) in panel A and panel C and corresponding fluorescence ratios ($I_{red}/I_{yellow}$) are respectively shown in panel B and panel D; and data are analyzed using the independent-samples T-test, with P<0.001, mean ±SD, n=3, and $\lambda_{ex}$=559 nm.
Figure 14:
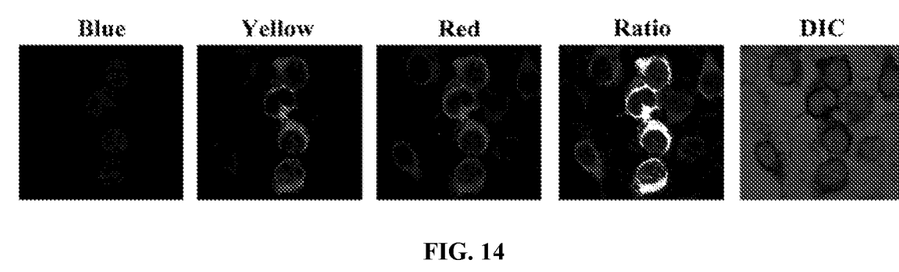
FIG. 14 shows the confocal fluorescent imaging of a cell mixture (LO2 and HepG2) by the probe NB-APN, where HepG2 cells are pre-stained with Hoechst-33342 (blue)
Figure 15:
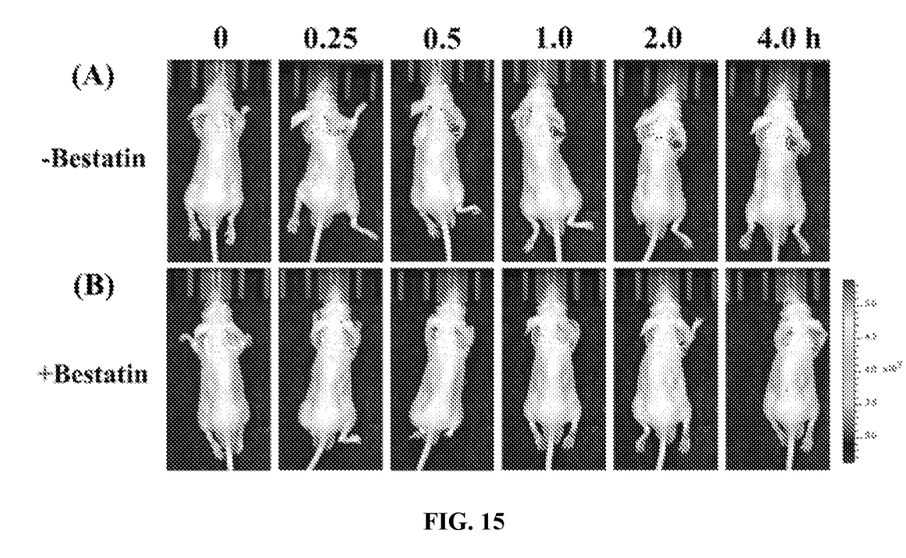
FIGS. 15A and 15B show the results of fluorescent imaging of HepG2 tumor-transplanted nude mice in the presence and absence of the enzyme inhibitor bestatin at different time points (0 h, 0.25 h, 0.5 h, 1.0 h, 2.0 h, and 4.0 h)
Figure 16:
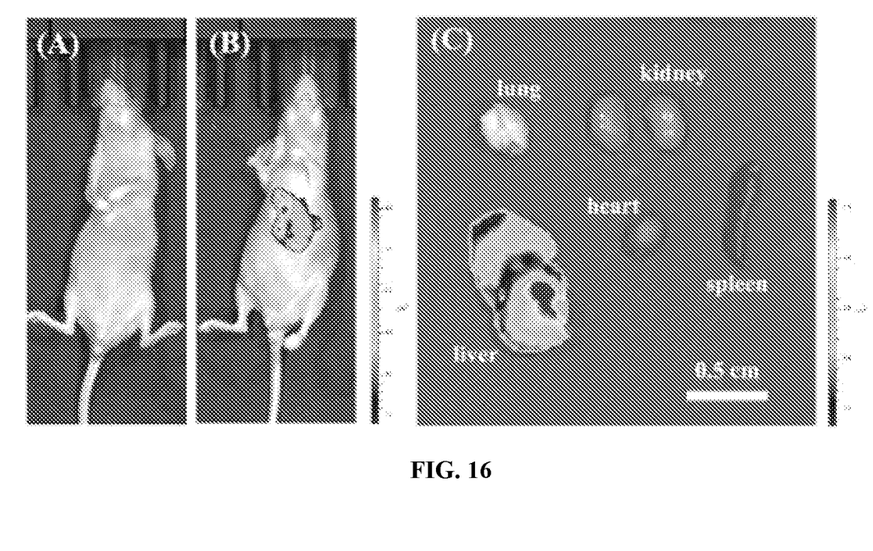
FIG. 16 shows the in vivo fluorescent imaging results of nude mice intraperitoneally pre-injected with PBS (panel A) or 300 mg/kg acetaminophen (APAP) (panel B) and then injected with 100 μL NB-APN (200 μM) through the tail vein, and the fluorescence image of main internal organs of nude mice pretreated with 200 μM NB-APN (panel C)

The NB-APN was used to image the activity of APN in nude mice with DILI. Results are shown in FIG. 13. Nude mice were intraperitoneally pre-injected with pH 7.4 PBS (control), and then injected with NB-APN through the tail vein. The background fluorescence signal of the nude mice was extremely low 6 h and 12 h after the NB-APN injection. Nude mice were intraperitoneally pre-injected with 300 mg/kg APAP and then injected with the probe, and 12 h after the probe injection, strong fluorescence appeared in the liver of the nude mice, indicating that the expression of APN was up-regulated in the DILI model. In addition, the nude mouse with DILI was sacrificed, and the main organs (heart, liver, spleen, lung, and kidney) and the tumor were collected for imaging after 3 h of NB-APN pretreatment. As shown in FIG. 13, the liver had a strong fluorescence signal, while the other organs did not have a fluorescence signal. These results indicate that the NB-APN is suitable for biopsy of a tumor tissue and has a significant clinical value.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A ratiometric fluorescent probe for detecting aminopeptidase N, wherein a structure of the ratiometric fluorescent probe comprises an alanyl group and a Nile blue derivative;

wherein the Nile blue derivative has a structural formula as follows:

wherein the ratiometric fluorescent probe has a structural formula as follows:

2. The ratiometric fluorescent probe according to claim 1, wherein in the structure of the ratiometric fluorescent probe, a quantity ratio of the alanyl group to the Nile blue derivative is 1:1.

3. A kit for fluorometric analysis of aminopeptidase N in a body fluid or fluorescent imaging of aminopeptidase N in a cell comprising the ratiometric fluorescent probe according to claim 1.

4. The kit for fluorescent imaging of aminopeptidase N in a cell according to claim 3, wherein the cell comprises a human normal cell and a human tumor cell.

5. The kit for fluorometric analysis of aminopeptidase N in a body fluid according to claim 3, wherein in the structure of the ratiometric fluorescent probe, a quantity ratio of the alanyl group to the Nile blue derivative is 1:1.

* * * * *